(12) United States Patent
Kalo'

(10) Patent No.: US 12,403,798 B2
(45) Date of Patent: Sep. 2, 2025

(54) SEAT ASSEMBLY AND VEHICLE COMPRISING SUCH SEAT ASSEMBLY

(71) Applicant: Alberto Kalo', Rome (IT)

(72) Inventor: Alberto Kalo', Rome (IT)

( * ) Notice: Subject to any disclaimer, the term of this patent is extended or adjusted under 35 U.S.C. 154(b) by 207 days.

(21) Appl. No.: 18/043,589

(22) PCT Filed: Sep. 1, 2021

(86) PCT No.: PCT/IB2021/057983
§ 371 (c)(1),
(2) Date: Mar. 1, 2023

(87) PCT Pub. No.: WO2022/049501
PCT Pub. Date: Mar. 10, 2022

(65) Prior Publication Data
US 2023/0347798 A1    Nov. 2, 2023

(30) Foreign Application Priority Data
Sep. 1, 2020  (IT) .......... 102020000020821

(51) Int. Cl.
*B60N 2/20* (2006.01)
*B60N 2/00* (2006.01)
*B60N 2/26* (2006.01)
*B60N 2/28* (2006.01)
*B60N 2/30* (2006.01)

(52) U.S. Cl.
CPC .......... *B60N 2/206* (2013.01); *B60N 2/0025* (2023.08); *B60N 2/26* (2013.01); *B60N 2/267* (2023.08); *B60N 2/2806* (2013.01); *B60N 2/3081* (2013.01)

(58) Field of Classification Search
CPC ....... B60N 2/26; B60N 2/2806; B60N 2/3081
USPC ....................... 297/354.1, 250.1, 254, 256.13
See application file for complete search history.

(56) References Cited

U.S. PATENT DOCUMENTS

| | | | | |
|---|---|---|---|---|
| 4,756,573 | A * | 7/1988 | Simin .................. | B60N 2/3084 297/238 |
| 4,936,627 | A * | 6/1990 | Guim .................. | B60N 2/3084 297/238 |
| 5,035,465 | A | 7/1991 | Nissan et al. | |
| 5,409,293 | A * | 4/1995 | Nagasaka .............. | B60N 2/305 297/236 |
| 5,498,062 | A * | 3/1996 | Holdampf ............ | B60N 2/3084 297/14 |

(Continued)

FOREIGN PATENT DOCUMENTS

| | | | | |
|---|---|---|---|---|
| DE | 4140637 C1 | 4/1993 | | |
| DE | 102011008288 A1 * | 10/2011 | ............ | B60R 1/008 |
| JP | 2011508703 A * | 9/2008 | | |

*Primary Examiner* — Jose V Chen
(74) *Attorney, Agent, or Firm* — Bayramoglu Law Offices LLC (57) ABSTRACT

A rear seat assembly of a vehicle provided with a seat and a backrest interposed between an internal space and a trunk, the rear seat assembly comprising a seat suitable for transporting children, which is carried by said rear seat assembly, the rear seat assembly being configured to assume a first configuration, in which the seat is housed inside the trunk and the seat and the backrest are free for use, and a second configuration, in which the backrest is moved to allow the seat to come out of the trunk and be used for transporting a child.

18 Claims, 5 Drawing Sheets

(56) References Cited

U.S. PATENT DOCUMENTS

| | | | | |
|---|---|---|---|---|
| 5,564,780 A * | 10/1996 | Presser | ................ | B60N 2/3047 |
| | | | | 297/238 |
| 5,588,700 A * | 12/1996 | Homier | ................ | B60N 2/3084 |
| | | | | 297/14 |
| 5,662,377 A * | 9/1997 | Holdampf | ............... | B60N 2/366 |
| | | | | 297/14 |
| 5,775,771 A * | 7/1998 | La Cour | ............. | B60N 2/3084 |
| | | | | 297/238 |
| 7,517,016 B1 * | 4/2009 | West | .................... | B60N 2/3086 |
| | | | | 297/240 |
| 7,658,431 B2 * | 2/2010 | Foussianes | .......... | B60N 2/2893 |
| | | | | 296/68.1 |
| 7,887,140 B1 * | 2/2011 | Forlivio | ............... | B60N 2/2839 |
| | | | | 297/238 |
| 2009/0051188 A1 | 2/2009 | Foussianes et al. | | |
| 2011/0043014 A1 | 2/2011 | Templaman et al. | | |
| 2015/0130235 A1 * | 5/2015 | Herut | ....................... | B60N 2/06 |
| | | | | 297/238 |

\* cited by examiner

SEAT ASSEMBLY AND VEHICLE COMPRISING SUCH SEAT ASSEMBLY

CROSS-REFERENCE TO RELATED APPLICATIONS

This application is the national phase entry of International Application No. PCT/IB2021/057983 filed on Sep. 1, 2021, which claims priority from Italian patent application no. 102020000020821 filed on Sep. 1, 2020, the entire disclosure of which are incorporated herein by reference.

TECHNICAL FIELD

The invention relates to a seat assembly for a vehicle, in particular to a seat assembly for a vehicle suitable for transporting children and compliant with current regulations concerning the transportation of children.

BACKGROUND

Children seat systems are known, which are designed to allow children to be safely transported in road vehicles in case of an accident.

Indeed, the seat positions and the safety belts used by adults cannot be used to protect children, since, in case of an accident, due to their weight and/or height, the way in which children are thrown out of a car is different from what happens to grown-ups and potentially much more dangerous.

To this purpose, child car seats are known, which need to be fixed to the vehicle seat and are configured to safely accommodate children in vehicles.

In particular, according to the recent UN ECE R129 regulation, there are three different types of car seats dedicated to different height ranges:

Type-"A" car seats, which are suitable for transporting children from 0 to 76-83 cm;
Type-"B" car seats, which are suitable for transporting children from 76-83 cm to 105 cm; and
Type-"C" car seats, which are suitable for transporting children from 105 cm to 150 cm.

Every type of car seat needs to be also provided with lateral containing means and, in case of type-A and type-B car seats, with specific safety belts.

Therefore, as a child grows up, three different types of car seats have to be bought, which, when needed, have to be fitted onto/removed from the seat and placed into/retrieved from the trunk.

Hence, a family with children has to bear significant costs because of these car seats and the continuous fitting/removing operations as well as the housing of the car seat in the trunk are time-consuming, complicated and, if not correctly carried out, potentially dangerous actions.

Example of known solutions, which, though, are not sufficient to solve the problems discussed above, are shown in documents DE4140637 C1, U.S. Pat. No. 5,035,465 A, US2011/043014 A1 or US2009/051188 A1.

Therefore, known cars seats have to be improved in order to allow children to be transported while fulfilling all the requirements set forth by current regulations and reducing the costs as well as the complexity of the operations that users have to carry out in order to install current car seats.

The object of the invention is to fulfil the needs discussed above.

SUMMARY

The aforesaid object is reached by a seat assembly and a vehicle comprising said assembly as claimed in the appended independent claims.

Further preferred embodiments of the invention are described in the dependent claims or in the claims connected to the aforesaid independent claims.

BRIEF DESCRIPTION OF THE DRAWINGS

The invention will be best understood upon perusal of the following detailed description of a preferred embodiment, which is provided by way of non-limiting example, with reference to the accompanying drawings, wherein.

DETAILED DESCRIPTION OF THE INVENTION

In the accompanying figures, number 1 generically indicates a road vehicle for passenger transportation, a so-called "passenger car", comprising, as it is known, a plurality of walls 2 defining an internal space 3.

As it is known, said vehicle houses in the internal space 3, among other things, a dashboard 4 and a plurality of seat assemblies 5, 6, such as front seat assemblies 5 and rear seat assemblies 6.

As shown in the accompanying figures, said pluralities of seat assemblies 5 and 6 are supported by a bottom 7 of the vehicle and the plurality of front seat assemblies 5 are arranged between the dashboard 4 and the plurality of rear seat assemblies 6 along the driving direction of the vehicle 1, whereas the plurality of rear seat assemblies 6 are arranged between the plurality of front seat assemblies 5 and a trunk 8 along the driving direction of the vehicle 1.

In particular, the trunk 8 is a portion of the internal space 3 delimited by a cover 9, which is normally carried in a removable manner between the plurality of rear seat assemblies 6 and the walls 2 of the vehicle 1.

As it is known, each seat assembly comprises a seat 11, which is fixed to the bottom 7 of the vehicle, and a backrest 12, which is connected to the seat 11, usually in a movable manner. Owing to the above, the cover 9 is carried in a removable manner between the walls 2 of the vehicle 1 and an upper portion of the backrests 12.

According to the invention, at least one of the seat assemblies of the plurality of rear seat assemblies 6 comprises a child seat 10 housed inside the trunk 8 and connected in a movable manner relative to the seat assembly 6, said seat 6 is configured to assume a first configuration, in which the seat 10 is housed inside the trunk 8 and the seat 11 and the backrest 12 are free for use, and a second configuration, in which the backrest 12 is moved so as to allow the seat 10 to come out of the trunk 8 and be used for transporting children.

According to the first embodiment of FIGS. 1 to 6, the seat assembly 6 is provided with a type-A seat 10, namely suitable for transporting children from 0 cm to 76-83 cm.

Figure 1:
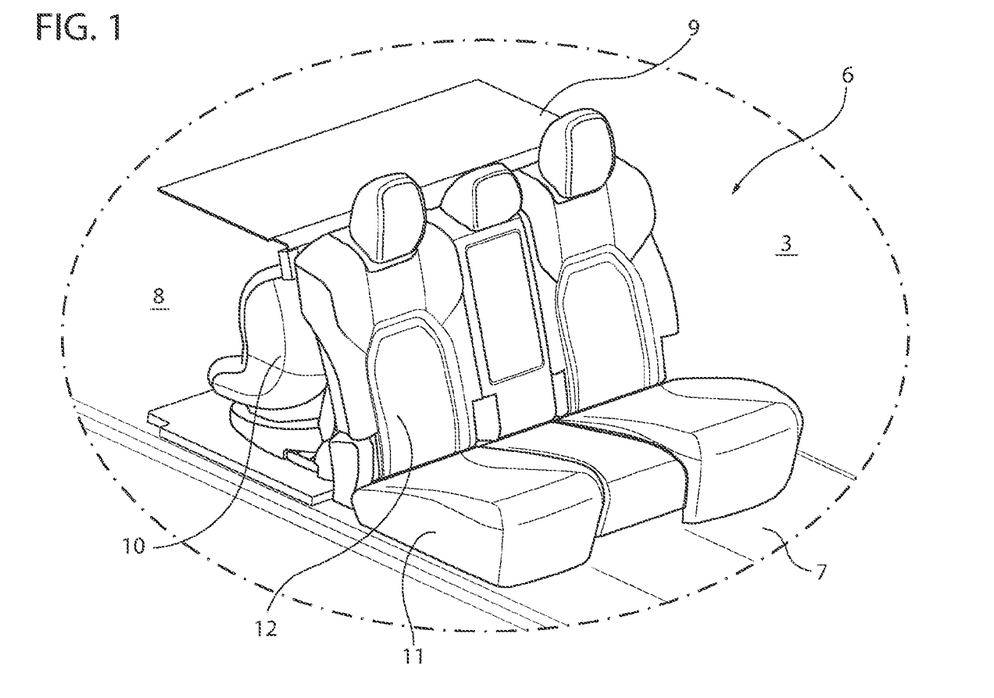
FIG. 1 is a perspective view, with parts removed for greater clarity, showing, at the front, a first embodiment of the seat assembly according to the invention.
Figure 2:
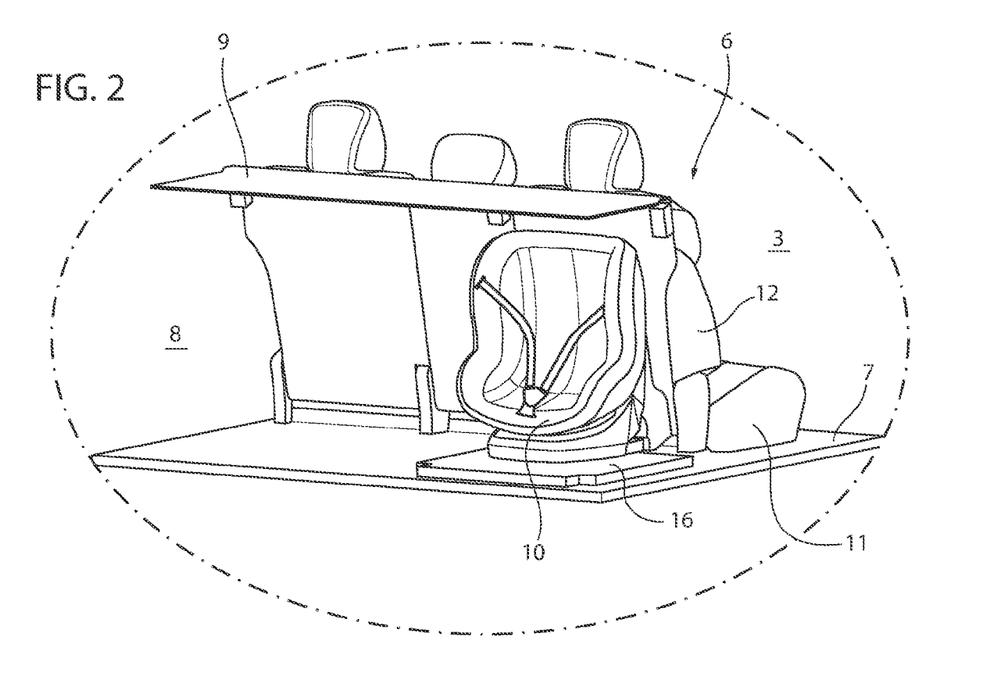
FIG. 2 is a perspective view, with parts removed for greater clarity, showing, at the back, the seat assembly of FIG. 1.

In this embodiment, according to FIGS. 1 and 2, the seat 10 is carried by the backrest 12 of the respective seat assembly 6 and is oriented so as to have opposite support relative to the backrest 12.

In this embodiment, the seat 11 is carried by the bottom 7 by means of hinge means 13, which are configured to allow the seat 11 to rotate around an axis A perpendicular to the driving direction of the vehicle and are arranged close to the front edge of the seat 11, namely on the opposite side relative to the backrest 12. According to FIG. 3, said hinge means 13 allow the seat 11 to shift from a first closed and usual configuration, which allows a passenger to sit, to a second overturned configuration, in which the seat 11 is in contact with the front seat assembly 5 arranged in front of the rear seat assembly 6 provided with the seat 10 according to the invention.

In this embodiment, the backrest 12 is carried by the bottom 7 in a sliding manner so as to assume a first retracted configuration, which allows a passenger to sit, and a second open and overturned configuration, in which the backrest 12 is closer to the front seat assembly 5. Furthermore, the backrest 12 is connected to the bottom 7 by means of hinge means 14, which are designed to allow the seat 11 to rotate around an axis B parallel to the axis A and are carried in a sliding manner on the bottom 7. Thanks to these hinge means 14, the backrest 12 can rotate so that, when it is in the second configuration, it is tilted so as to touch the backrest of the front seat assembly 5 in front of the seat assembly 6 provided with the seat 10 according to this embodiment.

In particular, the hinge means 14 are carried in a sliding manner on a linear guide 15, which is operatively interposed between the backrest 12 and the bottom 7 and is configured to allow the former to move between the aforesaid first and second configurations.

Figure 6:
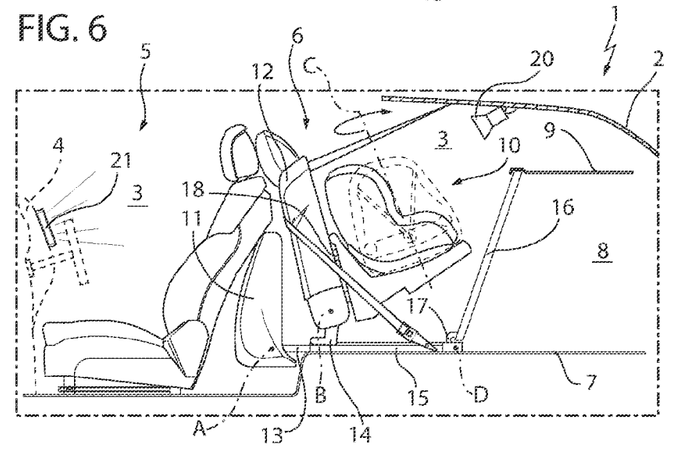

According to FIG. 6, the seat 10 is configured to rotate around an axis C, as it is known, around the support fixed to the seat 12.

The seat assembly 6 according to this configuration further comprises a panel 16, which is connected to the bottom 7, is housed in the trunk 8 and is configured to assume a first configuration, in which it is located under the seat 10 in the trunk 8 and a second operating configuration, in which it cooperates with the cover 9 in order to delimit the trunk 8 once the backrest 12 has been moved to its second configuration.

In particular, the panel 16 is configured to rotate around an axis D, which is parallel to the axes A and B and is defined by hinge means 17 obtained between a front edge of the panel 16 and the bottom 7. In the case described herein, said hinge means 17 are obtained with an end of the linear guide 15. On the opposite side, the panel 16 is configured to cooperate with the cover 9 in a removable manner, for example by means of a mechanical coupling.

Preferably, the seat 10 is coupled to the backrest 12 in a movable manner along the extension of the latter thanks to sliding means 18, such as, for example, a linear guide operatively interposed between the seat 10 and the backrest 12.

The movement of the backrest between the first and the second configuration or of the seat 10 relative to the backrest 12 can be manually operated or controlled by specific actuator means (not shown), for example hydraulic cylinders, pneumatic cylinders or electromechanical means controlled by an electronic unit of the vehicle.

After having been moved, the backrest 12 is held in its position thanks to known locking means, which are not shown herein. In addition, the standard safety belt of the vehicle 1 can be used to further firmly hold the backrest 12 in the tilted position. The seat 10, on the other hand, is provided with belts of its own suited for the purpose.

The vehicle 1 advantageously comprises image acquisition means 20, such as a video camera, which are carried by one of the walls 2 and are configured to frame a visual field containing the seat 10.

Consequently, the vehicle 1 comprises display means 21, such as a screen, for example carried by the dashboard 4 and electrically connected, for example through wires or in an electromagnetic manner, to the image acquisition means 20 so as to allow the image of the seat 10 to be displayed.

The embodiment of the seat assembly 6 described above works as follows, with reference to FIGS. 3 to 6.

In case users want to shift from the standard passenger transportation condition, namely from the configuration of FIGS. 1 and 2, to the children transportation condition, namely to the configuration of FIG. 6, the following operations can be carried out (either manually or in an automatic manner through a button).

First of all, the seat 11 needs to be tipped over (FIG. 3) so that it is placed against the front seat assembly 5. After that, the backrest 12 can be released and moved as well as rotated until it touches the front seat assembly 5.

Figure 3:
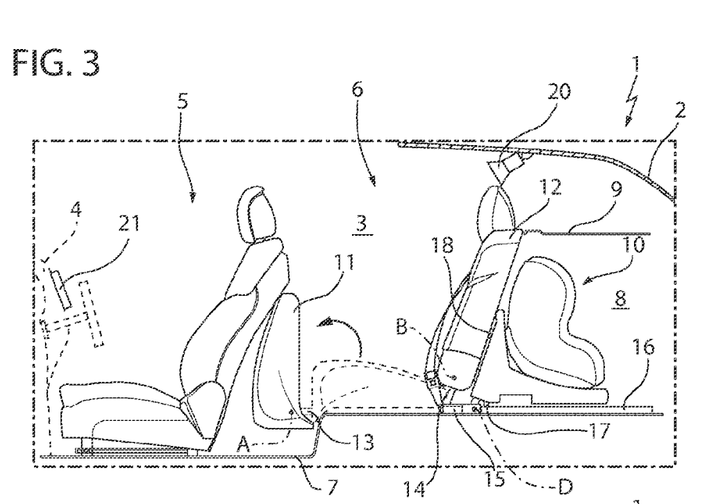
FIGS. 3 to 6 are schematic lateral views of the seat assembly of FIG. 1 in different operating conditions.
Figure 4:
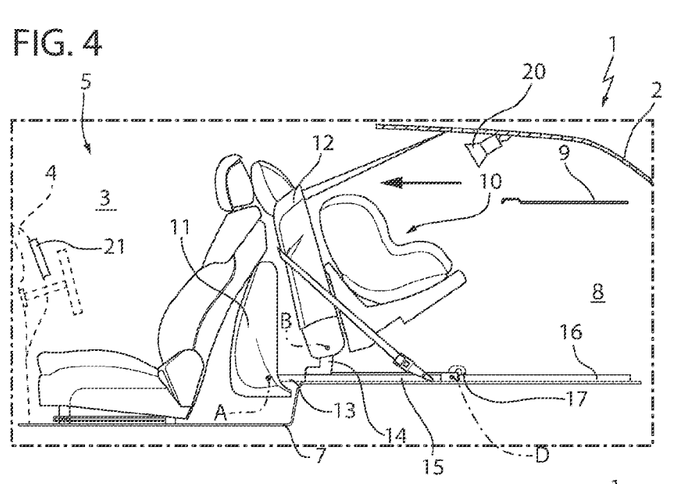
Figure 5:
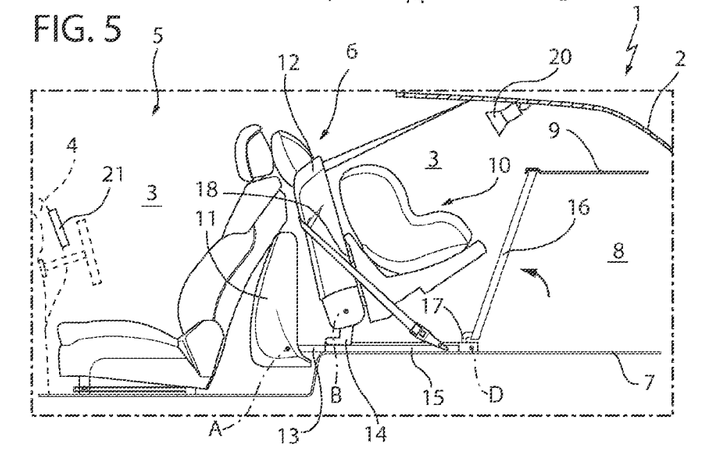

Once this position has been reached, the backrest 12 can be locked, the height of the seat 10 relative to it can be adjusted and the safety belt can be wound around the backrest 12 as further safety measure.

While transporting children, thanks to the presence of the image acquisition means 20 and of the display 21, the driver/other passengers of the vehicle sitting on the front seat assemblies 5 can check the state of the child accommodated in the seat 10 without having to turn their heads, thus looking away from the road.

According to the second embodiment of FIGS. 7 to 13, the seat assembly 6 is provided with a type-B and/or C seat 100, namely suitable for transporting children exceeding 6-83 cm.

Figure 10:
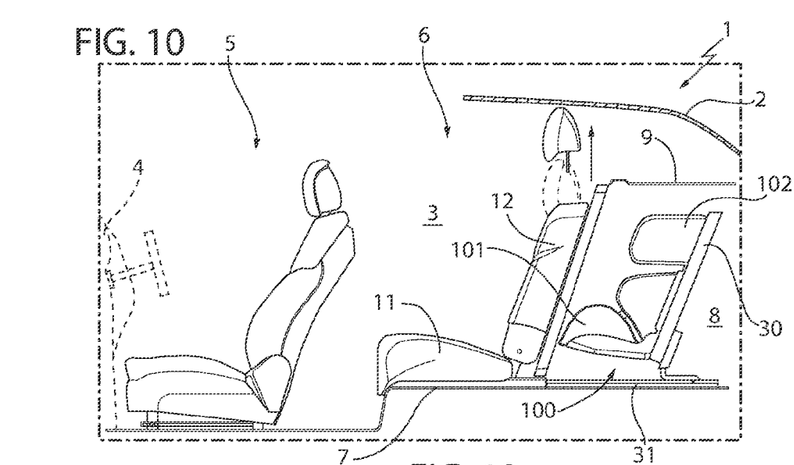
FIGS. 10 to 12 are schematic lateral views of the seat assembly of FIGS. 7 and 8 in different operating conditions.

In this embodiment, according to FIG. 10, the seat 100 is carried by the bottom 7 behind the respective seat assembly 6 and is oriented so as to define a support for the child in the same direction as the one defined by the backrest 12 for an adult passenger. In particular, the seat 100 is fixed to a wall 30 carried in a sliding manner relative to the bottom 7. In particular, the wall 30 is carried by the bottom 7 by means of a linear guide 31, which is operatively interposed between the wall 30 and the bottom 17.

Figure 13:
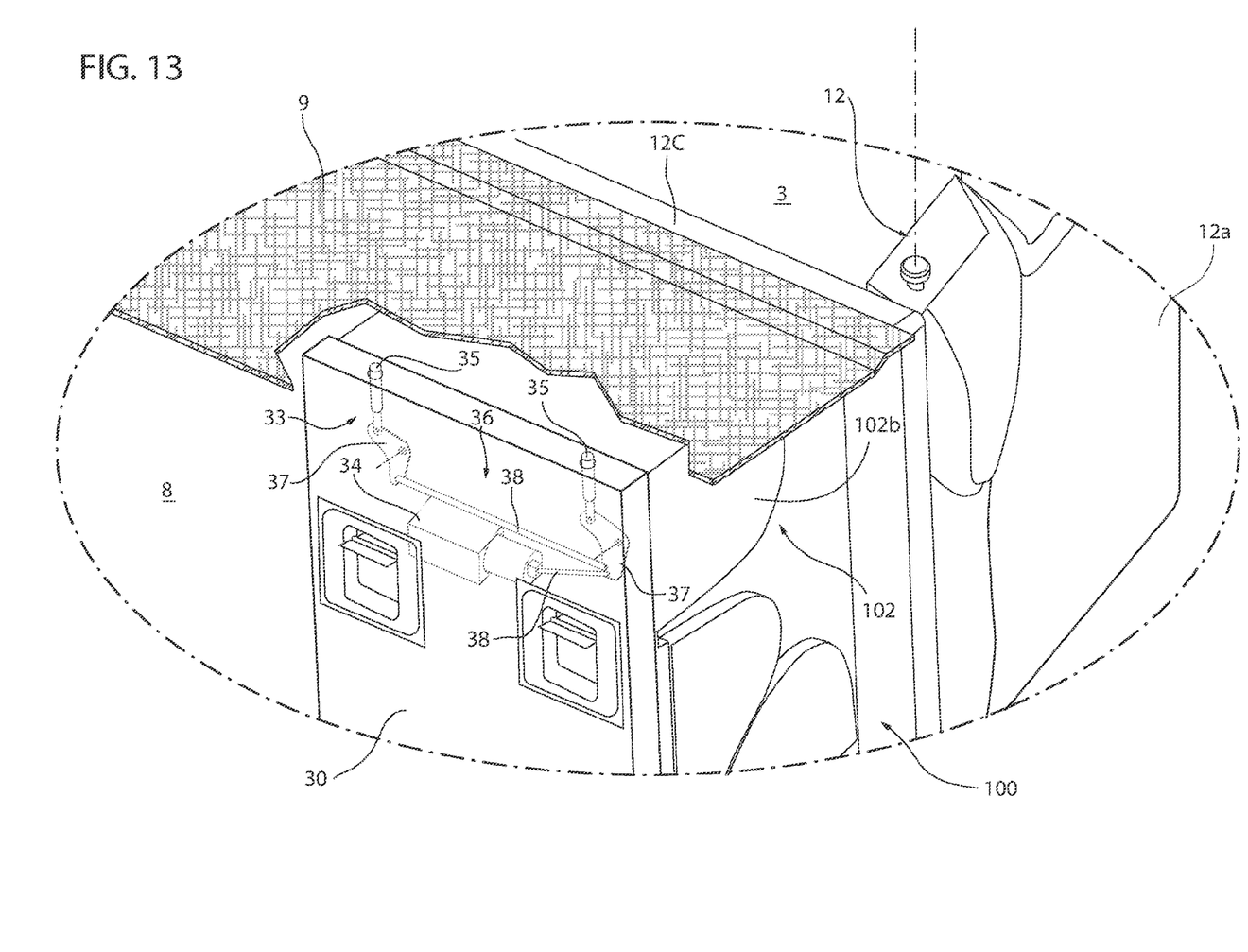
FIG. 13 is an enlarged perspective view of a portion of the seat assembly of FIG. 8.

In this embodiment, the seat 11 is carried by the bottom 7 in a fixed manner, whereas the backrest 12 comprises two portions 12a, 12b, which are connected in a movable manner around a frame 12c, which is better visible in FIG. 13, and are configured to rotate around respective rotation axes E. Hence, said portions 12a, 12b are advantageously connected to the aforesaid elements by means of hinges 32 obtained on lateral end edges thereof.

Figure 7:
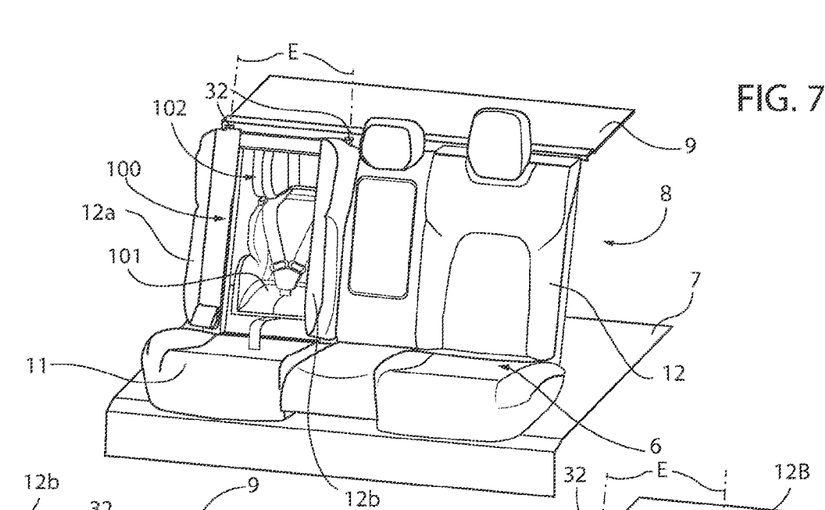
FIGS. 7 and 8 are perspective views, with parts removed for greater clarity, showing different operating steps of a seat assembly according to a second embodiment of the invention.

Advantageously, the portions 12*a*, 12*b* are symmetrical to one another relative to a sagittal axis of the backrest 12 and, in view of the hinge connection 32 described above, define a first closed configuration, according to FIG. 10, in which both portions 12*a*, 12*b* are in contact along an edge opposite the one connected by the hinges 32 and allow a passenger to sit, and a second open configuration, according to FIG. 7, in which the portions 12*a*, 12*b* are open and allow the seat 100 to be inserted as described below.

The movement and the locking of the portions 12*a*, 12*b* can be manually operated or controlled by specific actuator means (not shown), for example hydraulic cylinders, pneumatic cylinders or electromechanical means controlled by an electronic unit of the vehicle.

According to what explained above, the seat 100 can move along the linear guide 31 so as to assume a first configuration, in which it is entirely housed inside the trunk 8, and a second configuration, in which it is placed on the seat 11 within the space left free by the opening of the portions 12*a*, 12*b*.

Figure 8:
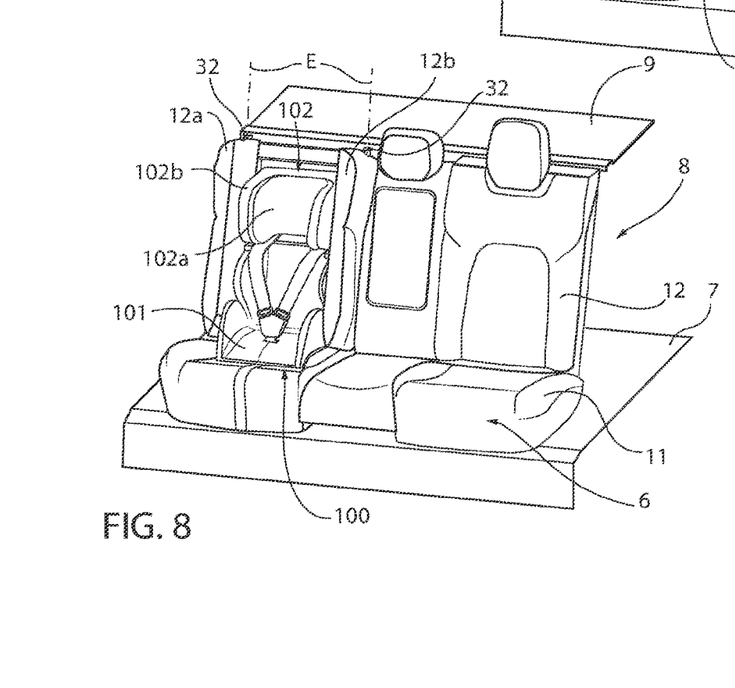
Figure 9:
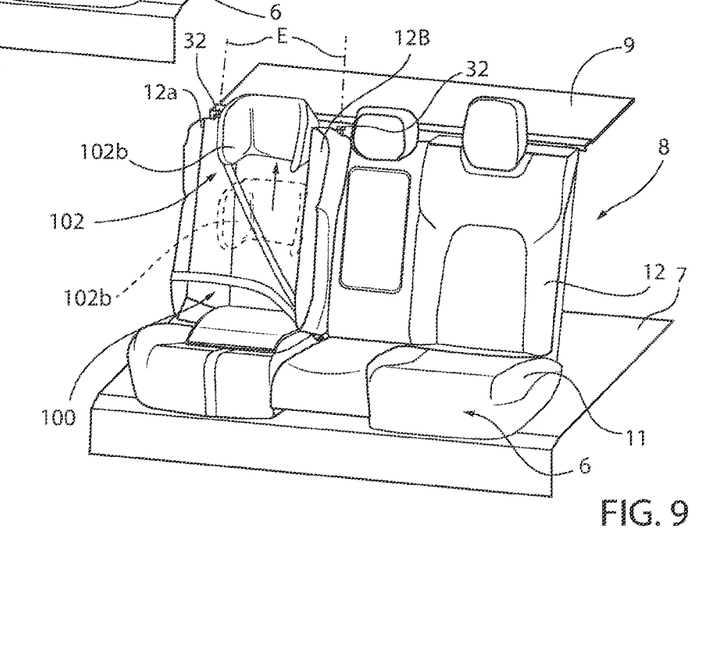
FIG. 9 is a perspective view of FIG. 8 showing a further configuration of the seat assembly according to the second embodiment of the invention.

In particular, as clearly visible in FIGS. 8 and 9, the seat 100 comprises a seat 101, which is carried by the wall 30 and is configured to be laterally comprised between the portions 12*a*, 12*b*, and a headrest 102, which is carried in a sliding manner by the wall 30 and comprises an external portion 102*a* and an internal portion 102*b*.

The headrest 102 is configured to vertically move relative to the seat 101, as shown in FIGS. 8 and 9, for example thanks to a linear guide (not shown) obtained between the wall 30 and the external portion 102*a* of the headrest 102.

Furthermore, the seat 101 can selectively be removed from the wall 30, for example by means of threaded elements or a removable mechanical coupling, which are not shown herein, and the internal portion 102*b* is configured to be detached from the external portion 102*a* of the headrest 102 in order to shift from a type-"B" configuration to a type-"C" configuration.

In particular, in the type-"B" configuration, the seat 101 rests on the seat 11 and lateral supports are defined, which are designed to hold the child in place, whereas, in the type-"C" configuration, the child can directly be placed on the seat 11 and the portions 12*a*, 12*b* of the backrest 12 define the lateral support holding the child in place. Consequently, the wall portion 30 facing the portions 12*a* 12*b* is covered with a soft material in order to allow the child to rest his/her back against it.

Thanks to the fact that the headrest 102 is vertically movable, it can be adjusted to the current height of the child to be transported in both configurations.

According to FIGS. 7 and 8, in the type-"B" configuration, the removable seat 101 is provided with dedicated belts, whereas, according to FIG. 9, the type-"C" configuration is not provided with belts, as the standard ones already present in the vehicle can be used.

According to FIG. 13, the wall 30 can selectively be fixed to the frame 12*c* by means of locking means 33, which are configured to selectively fix the wall 30 to the frame 12*c* and, hence, allow the seat 100 to remain stable.

In particular, according to this embodiment, the locking means 33 are electromechanical means and comprise an electric actuator 34, which is configured to allow a pair of pins 35 to be inserted into respective seats (not shown) obtained in the frame 12*c*.

Preferably, the electric actuator 34 controls the pins 35 by means of a lever mechanism 36 comprising a pair of brackets 37 with a triangular shape, which are hinged, at one of their vertexes, to the wall 36, and a plurality of rods 38 connecting the electric actuator 34, the brackets 37 and the pins 35 to one another.

The embodiment of the seat assembly 1 described above works as follows, with reference to FIGS. 10 to 13.

In case users want to shift from the standard passenger transportation condition to the children transportation condition, namely to the configuration of FIG. 8 or 9, the following operations can be carried out (either manually or in an automatic manner through a button).

Figure 11:
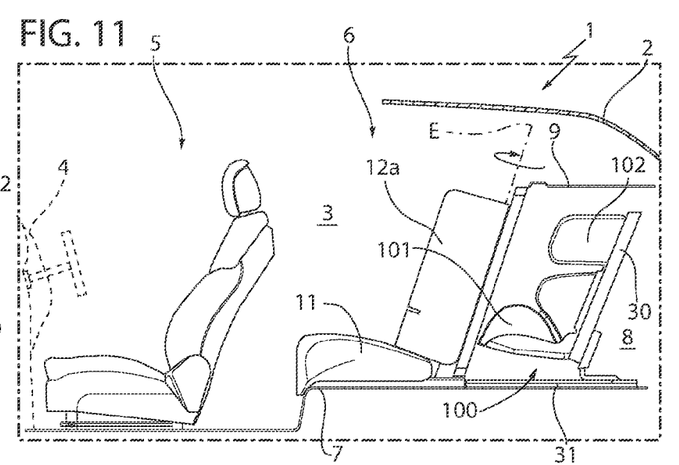
Figure 12:
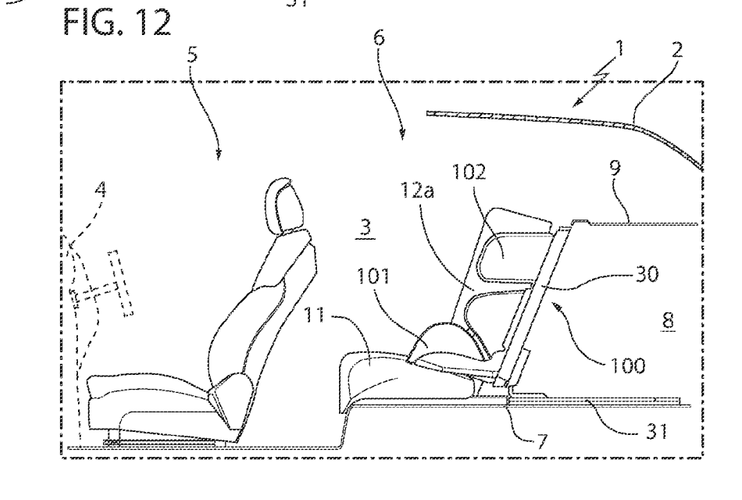

First of all, the headrest needs to be eliminated and the seat 11 needs to be tipped over (FIG. 10) so that the portions 12*a*, 12*b* of the seat 12 can be released and rotated, thus allowing them to reach their second configuration (FIG. 11). At this point, the seat 100 can be moved until the wall 30 is locked inside the frame 12*c*, namely, in the case described herein, until the pins 35 are integral to the frame 12*c*.

Now the seat 100 can be used and the position of the headrest 102 can be adjusted depending on the height of the child. In case users need to shift from the type-B to the type-C configuration, it is sufficient to remove the seat 101 and the internal portions 102*a* of the headrest 102. In case of a type-B seat, the child can be secured to the seat 100 by means of specific belts included in the seat 101, whereas, for a type-C configuration, normal safety belts can used. The seat 10, 100 described above can clearly be configured with two seats and comprise one or more sensors electrically connected to an electronic control unit, for example the ECU of the vehicle, in order to provide support information.

Said electronic unit is electronically connected to the sensors and is configured to warn the driver and/or warn a rescue network and/or inhibit a function of the vehicle in case a specific predetermined quantity is detected, which indicates a state of danger for the child accommodated on the car seats.

A first sensor example can be a weight sensor to detect or not to detect the presence of a child. In this case, the electronic unit is configured to warn the driver of the vehicle of his/her presence in case he/she wants to change configuration of the seats or close the doors (anti-abandonment) and/or avoid these actions.

A second sensor example can be an acceleration sensor configured to detect impacts of the car seat. In this case, the electronic unit is configured to send an automatic rescue message to a utility, such as a rescue station, the police or the like.

Owing to the above, the advantages of a seat assembly 6 according to the invention are evident.

Thanks to the specific arrangement of a seat assembly 6 provided with a car seat 10, 100, the shift from passenger seat to seat provided with a child car seat can be automated or become extremely simpler and reliable.

Furthermore, parents no longer need to buy three different types of car seat, but only have to buy two types of car seat, as the change from type-B configuration to type-C configuration can be carried out by simply removing some elements from a type-B car seat. All three types of car seat clearly are type-approved so as to fulfil the requirements of currently enforced regulations.

The integration of the car seat 10, 100 in the backrest 12 of the seat assembly 6 further saves space in the trunk.

Furthermore, the presence of video cameras and displays allows parents to easily monitor their children when using type-A car seats.

Finally, the seat assembly 6 according to the invention can be subjected to changes and variants, which, though, do not go beyond the scope of protection set forth in the appended claims.

For example, the number, shape and type of seats inside the vehicle 1 and the type of vehicle 1 can clearly be different.

Furthermore, the actuator means described herein and the movements shown herein are mere examples of possible embodiments.

Moreover, further and different elements, in addition to the essential ones claimed herein, can be comprised.

The invention claimed is:

1. A rear seat assembly of a vehicle, said rear seat assembly comprising a first seat and a backrest interposed between an internal space and a trunk of said vehicle, said rear seat assembly comprising a second seat suitable for transporting children, said second seat is carried by said rear seat assembly, said assembly of rear seat is configured to assume a first configuration in which said second seat is housed inside said trunk and said first seat and said backrest are free to use and a second configuration in which said backrest is moved to allow said second seat to come out of said trunk and to use it for transporting a child, wherein said second seat is carried by said backrest, said first seat is configured to tip over with respect to a front edge, shifting from a first closed configuration to a second open configuration, in which it touches an element of said vehicle, and said backrest is configured to slide with respect to and tilt with respect to a bottom of said vehicle in order to shift from a first retracted configuration to a second open and overturned configuration, in which it is in contact with said element and locked to rotation, said second seat facing away from said element.

2. The rear seat assembly of the vehicle according to claim 1, wherein said second seat is carried by said backrest in a sliding manner with respect to its length.

3. The rear seat assembly of the vehicle according to claim 2, wherein said first seat is hinged to said base.

4. The rear seat assembly of the vehicle according to claim 2, wherein said backrest is connected to a linear guide sliding with respect to said bottom by means of hinge means configured to allow the rotation of said backrest with respect to said linear guide.

5. The rear seat assembly of the vehicle according to claim 2, comprising a wall connected to said seat assembly and configured to assume a first open configuration, in which it is in contact with said bottom inside said trunk, and a second operational configuration, in which it is coupled to an element of said vehicle to delimit said trunk when said backrest is in said second configuration.

6. The rear seat assembly of the vehicle according to claim 1, wherein said first seat is hinged to said base.

7. The rear seat assembly of the vehicle according to claim 6, wherein said backrest is connected to a linear guide sliding with respect to said bottom by means of hinge means configured to allow the rotation of said backrest with respect to said linear guide.

8. The rear seat assembly of the vehicle according to claim 6, comprising a wall connected to said seat assembly and configured to assume a first open configuration, in which it is in contact with said bottom inside said trunk, and a second operational configuration, in which it is coupled to an element of said vehicle to delimit said trunk when said backrest is in said second configuration.

9. The rear seat assembly of the vehicle according to claim 1, wherein said backrest is connected to a linear guide sliding with respect to said bottom by means of hinge means configured to allow the rotation of said backrest with respect to said linear guide.

10. The rear seat assembly of the vehicle according to claim 1, comprising a wall connected to said seat assembly and configured to assume a first open configuration, in which it is in contact with said bottom inside said trunk, and a second operational configuration, in which it is coupled to an element of said vehicle to delimit said trunk when said backrest is in said second configuration.

11. A vehicle comprising at least one seat assembly according to claim 1.

12. The vehicle according to claim 11, further comprising image acquisition means configured to acquire a visual field containing said second seat and display means electrically connected to said image acquisition means and configured to allow the visualization of said visual field acquired by passengers accommodated on assemblies of front seats of said vehicle.

13. A rear seat assembly of a vehicle, said rear seat assembly comprising a first seat and a backrest interposed between an internal space and a trunk of said vehicle, said rear seat assembly comprising a second seat suitable for transporting children, said second seat is carried by said rear seat assembly, said assembly of rear seat is configured to assume a first configuration in which said second seat is housed inside said trunk and said first seat and said backrest are free to use and a second configuration in which said backrest is moved to allow said second seat to come out of said trunk and to use it for transporting a child, wherein said backrest comprises a pair of portions carried by a frame fixed to said vehicle, said portions are configured to assume a first closed configuration and a second open configuration, wherein said second seat is slidably carried with respect to said bottom and is configured to assume a first configuration in which said second seat is housed in said trunk and a second configuration in which said second seat is positioned between said pair of portions.

14. The rear seat assembly of the vehicle according to claim 13, wherein said second seat comprises a wall sliding with respect to said bottom, a third seat carried by said wall and sized to be housed between said pair of portions and above said first seat and a headrest carried in a movable way by said wall.

15. The rear seat assembly of the vehicle according to claim 14, wherein said third seat is selectively removable from said wall.

16. The rear seat assembly of the vehicle according to claim 14, wherein said headrest comprises an external portion housed between said side portions and carried in a sliding manner by said wall and an internal portion carried in a selectively removable way from said external wall.

17. The rear seat assembly of the vehicle according to claim 14, wherein said seat assembly comprising locking means configured to selectively lock said wall to said frame.

18. The rear seat assembly of the vehicle according to claim 13, wherein said wall is slidably carried on said bottom by means of a linear guide.

* * * * *